(12) United States Patent
Hao et al.

(10) Patent No.: US 11,050,489 B2
(45) Date of Patent: Jun. 29, 2021

(54) INDOOR VISIBLE LIGHT POSITIONING METHOD AND SYSTEM BASED ON SINGLE LED LAMP

(71) Applicant: NANJING UNIVERSITY OF AERONAUTICS AND ASTRONAUTICS, Jiangsu (CN)

(72) Inventors: Jie Hao, Jiangsu (CN); Jing Chen, Jiangsu (CN)

(73) Assignee: NANJING UNIVERSITY OF AERONAUTICS AND ASTRONAUTICS, Jiangsu (CN)

( * ) Notice: Subject to any disclaimer, the term of this patent is extended or adjusted under 35 U.S.C. 154(b) by 0 days.

(21) Appl. No.: 16/881,853

(22) Filed: May 22, 2020

(65) Prior Publication Data

US 2020/0374005 A1 Nov. 26, 2020

(30) Foreign Application Priority Data

May 24, 2019 (CN) .......................... 201910441840.4

(51) Int. Cl.
| | |
|---|---|
| *H04B 10/116* | (2013.01) |
| *H05B 45/10* | (2020.01) |
| *H05B 47/195* | (2020.01) |
| *F21V 33/00* | (2006.01) |
| *G01S 17/46* | (2006.01) |
| *H04B 10/50* | (2013.01) |

(Continued)

(52) U.S. Cl.
CPC ........ *H04B 10/116* (2013.01); *F21V 33/0052* (2013.01); *G01S 17/46* (2013.01); *H04B 10/502* (2013.01); *H04N 5/145* (2013.01); *H04N 5/23277* (2013.01); *H05B 45/10* (2020.01); *H05B 47/195* (2020.01); *F21W 2111/10* (2013.01); *F21Y 2115/10* (2016.08)

(58) Field of Classification Search
CPC .... H04B 10/116; H04B 45/10; H04B 47/195; H04B 10/502; G01S 17/46; G01S 5/16; H04N 5/145; H04N 5/23254; H04N 5/23258; H04N 5/23277

See application file for complete search history.

(56) References Cited

U.S. PATENT DOCUMENTS

| | | | |
|---|---|---|---|
| 7,583,901 B2 * | 9/2009 | Nakagawa ............... | H04B 3/54 398/183 |
| 9,360,310 B2 * | 6/2016 | Tan .......................... | G01V 8/20 |

(Continued)

*Primary Examiner* — Tanya T Motsinger
(74) *Attorney, Agent, or Firm* — MH2 Technology Law Group, LLP

(57) ABSTRACT

An indoor visible light positioning method and system based on a single LED lamp. The system includes an LED communication module and a smartphone module. The LED communication module sends its coordinates and shape data to the smartphone module. The smartphone module includes an inertial measurement unit (IMU) and a camera. The IMU is configured to obtain movement data of a smartphone. The camera is configured to shoot video streams of the LED lamp. Computing processing is performed on center point coordinates of the LED lamp and IMU data in the video streams, and constraints are provided by using a homography matrix of ellipses in the video streams, to obtain accurate location information of the smartphone, and provide location-based services such as navigation and query for a user.

5 Claims, 3 Drawing Sheets

(51) Int. Cl.
  *H04N 5/232* (2006.01)
  *H04N 5/14* (2006.01)
  *F21Y 115/10* (2016.01)
  *F21W 111/10* (2006.01)

(56) References Cited

U.S. PATENT DOCUMENTS

| | | | |
|---|---|---|---|
| 9,883,351 B2* | 1/2018 | Tan | G01S 1/7034 |
| 2013/0265502 A1* | 10/2013 | Huebner | A63F 13/577 |
| | | | 348/789 |
| 2014/0347648 A1* | 11/2014 | Roberts | G01S 17/06 |
| | | | 356/4.01 |
| 2016/0328591 A1* | 11/2016 | Santi | G06K 7/1408 |
| 2017/0178355 A1* | 6/2017 | Alibay | G06T 7/73 |
| 2017/0276767 A1* | 9/2017 | Ho | H04B 10/502 |
| 2020/0302615 A1* | 9/2020 | Lin | G06K 9/6215 |
| 2020/0374005 A1* | 11/2020 | Hao | F21V 33/0052 |

\* cited by examiner

INDOOR VISIBLE LIGHT POSITIONING METHOD AND SYSTEM BASED ON SINGLE LED LAMP

CROSS REFERENCE TO RELATED APPLICATIONS

This application claims priority under 35 U.S.C. § 119 to Chinese Patent Application No. 201910441840.4, which was filed on 24 May 2019, the entire contents of which is hereby expressly incorporated by reference in its entirety.

TECHNICAL FIELD

The present invention relates to an indoor positioning technology, and in particular, to an indoor visible light positioning method and system based on a single LED lamp.

BACKGROUND

In recent years, buildings are designed to have more floors and larger areas. With the growing complexity of indoor environments, a large number of indoor positioning technologies emerge, such as Wi-Fi, RFID, UWB, iBeacon, ZigBee, and infrared indoor positioning technologies. In daily life, light-emitting diode (LED) lamps not only can function as illumination light sources, but also can perform high-speed communication. With the advantages such as low cost, high security, high speed, environmental friendliness, energy saving, and no need for spectrum licensing, visible light communication (VLC) can alleviate the shortage of wireless spectrum resources to a great extent. With the popularity of LED lamps, VLC has broad development prospects in various fields, and a lot of indoor positioning technologies using VLC also emerge.

The existing indoor visible light positioning (VLP) technologies require at least three LED lamps for indoor positioning. In addition, the existing VLP technologies are integrated with RSS, AOA, or cameras. However, the VLP solutions based on RSS and AOA usually have estimation errors, and the positioning accuracy is not high. In actual life, many places such as long corridors and small rooms do not have many LED lamps, or the LED lamps are sparsely distributed. Receivers (light sensors or smartphone cameras) can sense only one or two LED lamps in most of time.

SUMMARY

To overcome the shortcomings in the prior art, at least one embodiment of the present invention provides an indoor visible light positioning method and system based on a single LED lamp, to position smartphone users by using an LED lamp containing frequency information, a camera, and an inertial measurement unit (IMU). In at least one embodiment of the present invention, an LED communication module performs efficient modulation and coding for an LED lamp by using run length limited (RLL) coding and Raptor coding. The LED lamp loads its information such as the radius, ID, and actual coordinates. Corresponding flashing frequencies are set for such information for data transmission. A smartphone module uses a camera to shoot video streams of the LED lamp, and records IMU measurement data of a smartphone at the same time. LED lamp images are captured from each frame of the video streams for decoding and demodulation, to extract the LED lamp shape in the images, and collect a series of information such as the radius and actual coordinates of the LED lamp. The IMU data and LED lamp data together provide good constraints and optimization conditions for the VLP technology, thereby implementing accurate indoor positioning.

To achieve the above objective, the technical solution adopted by various embodiments of the present invention is as follows:

an indoor visible light positioning method based on a single LED lamp. At least one embodiment of the present invention discusses the indoor VLP technology based on a single LED lamp in scenarios where LED lamps are sparsely distributed. At least one embodiment of the present invention implements indoor visible light positioning in single-LED scenarios by using an IMU and a camera of a smartphone. The IMU measures movement data from the smartphone, and the camera shoots videos. The IMU and camera have been used in many studies, and these sensor components are integrated in all smartphones on the market. With a smartphone, users can position their locations. Data collected by the IMU and camera can also compensate for the insufficient information provided by a single LED lamp during the positioning process. Based on various information from the LED lamp and smartphone, positioning constraints and location information of the smartphone can be provided according to the projective geometry in computer vision.

The visible light communication technology efficiently encodes and modulates to-be-sent information, and then the LED lamp emits corresponding frequencies to transmit the information to a receiving end. The receiving end decodes and demodulates the received information to complete the communication. The highly reliable RLL coding and Raptor coding ensure the integrity and efficiency of visible light communication. RLL coding is a line encoding technology used to transmit data over a bandwidth-limited communication channel. It is generally defined by four parameters: (m,n,d,k). m and n represent code rates, d represents the minimum number of consecutive 0s, and k represents the maximum number of consecutive 0s. As a fountain code, Raptor coding features low computation complexity, low overheads, and high efficiency, and can produce a sequence of infinite encoded symbols from a given set of source symbols. Ideally, the source symbols can be restored by simply obtaining a subset of any encoded symbols that is of a same size as or slightly larger than the source symbols, thereby providing reliable communication. The method specifically includes the following steps:

Step 1: use the visible light communication technology to encode and modulate to-be-sent information, and transmit the information through an LED lamp.

Step 2: shoot video streams of the LED lamp by using a camera of a smartphone, and record data measured by an IMU of the smartphone, and measure, by the IMU, acceleration $(a_x, a_y, a_z)$ and rotation angle information $(\alpha,\beta,\gamma)$ of the smartphone in all directions to calculate a movement direction and displacement $(t_x, t_y, t_z)$ of the smartphone.

Step 3: capture LED lamp images from each frame of the video streams, decode and demodulate the data transmitted by the LED lamp, extract an LED lamp shape from the images, and collect a location $(X_o, Y_o, Z_o)$ and a radius $R_o$ of the LED lamp in a world coordinate system.

Step 4: divide the video streams into single image frames by timeslot, and for every two adjacent images $I_i$ and $I_{i+1}$, calculate a homography matrix:

$$H_{i,i+1}=K[R_{i,i+1}+t_{i,i+1}n_i^T/z_i]K^{-1}$$

where $H_{i,i+1}$ is the homography matrix, K is an intrinsic matrix of the smartphone camera, $n_i$ is a normal vector of a lamp plane in an $i^{th}$ camera coordinate system, $z_i$ is a distance from a center of the camera to the lamp plane when the $i^{th}$ image is taken, $R_{i,i+1}$ is a rotation matrix of the camera, and $t_{i,i+1}$ is a displacement parameter of the camera.

A general elliptic equation is:

$$ax^2+bxy+cy^2+dx+ey+f=0$$

For multi-view geometry, export the homography matrix $H_{i,i+1}$ between $I_i$ and $I_{i+1}$ through elliptical shapes projected onto the images, where an ellipse on each image is represented by a conic coefficient matrix $C_i$:

$$C_i = \begin{bmatrix} a_i & 0 & d_i/2 \\ 0 & c_i & e_i/2 \\ d_i/2 & e_i/2 & f_i \end{bmatrix}$$

where [$a_i$, $b_i$, $c_i$, $d_i$, $e_i$, $f_i$] represent coefficients of a general equation of an ellipse projected on the $i^{th}$ image.

Under the homography matrix $H_{i,i+1}$, convert $C_i$ into $C_{i+1}=H_{i,i+1}^{-T}C_iH_{i,i+1}^{-1}$ to establish an optimization model:

$$\min_{z_1, z_2, \ldots z_n} \|C_{i+1} - H_{i,i+1}^{-T}C_iH_{i,i+1}^{-1}\|_2$$

where $z_1, z_2, \ldots z_n$ represents a distance from the center of the camera to the lamp plane when image 1, 2, . . . , n is taken, and n represents a total quantity of video frames. Calibrate the rotation matrix $R_{i,i+1}$ through the optimization model.

Firstly, use the IMU to measure a movement status of the smartphone to obtain $R_{i,i+1}$ and $t_{i,i+1}$.

The rotation matrix $R_{i,i+1}$ is calculated from $(\alpha,\beta,\gamma)$.

$$R = \begin{bmatrix} \cos\gamma & -\sin\gamma & 0 \\ \sin\gamma & \cos\gamma & 0 \\ 0 & 0 & 1 \end{bmatrix} \begin{bmatrix} \cos\beta & 0 & \sin\beta \\ 0 & 1 & 0 \\ -\sin\beta & 0 & \cos\beta \end{bmatrix} \begin{bmatrix} 1 & 0 & 0 \\ 0 & \cos\alpha & -\sin\alpha \\ 0 & \sin\alpha & \cos\alpha \end{bmatrix}$$

However, $\alpha$ and $\beta$ measured by the IMU are accurate, but $\gamma$ has a great error. Therefore, the optimization model is required.

$$\min_{z_1, z_2, \ldots z_n} \|C_{i+1} - H_{i,i+1}^{-T}C_iH_{i,i+1}^{-1}\|_2$$

The homography matrix $H_{i,i+1}$ between every two images contains $(\alpha,\beta,\gamma)$ measured by the IMU. By default, $\alpha$ and $\beta$ can be directly substituted into the optimization model. $C_i$ and $C_{i+1}$ are obtained from the elliptical shapes in the images, and can also be substituted into the optimization model. Then a value $\gamma'$ meeting the optimization model is obtained. The value $\gamma'$ has multiple solutions, but $\gamma'$ needs to meet some conditions such as within the error range of the original value $\gamma$.

To put it simply, in the optimization model, only an approximate location of $\gamma$ is known, but an exact angle of $\gamma$ is unknown. Therefore, the optimized value $\gamma'$ is obtained and substituted into $R_{i,i+1}$ to obtain the final rotation matrix.

Step 5: calculate intrinsic and extrinsic matrices of the camera based on the calibrated camera parameters.

The intrinsic matrix $M_1$ is:

$$M_1 = \begin{bmatrix} f/d_X & 0 & \mu_0 & 0 \\ 0 & f/d_Y & \upsilon_0 & 0 \\ 0 & 0 & 1 & 0 \end{bmatrix}$$

where f is a focal length of the camera, $d_X$ and $d_Y$ represent physical dimensions of each pixel in an image in the X axis and Y axis, and ($u_0$, $v_0$) represents an origin of an image coordinate system.

Calculate the extrinsic matrix $M_2$ based on the movement direction and displacement ($t_x$, $t_y$, $t_z$) of the smartphone:

$$M_2 = \begin{bmatrix} R & t \\ 0^T & 1 \end{bmatrix}$$

In the extrinsic matrix, $0^T=(0,0,0)^T$, R is the rotation matrix of the smartphone, and t is a three-dimensional translation variable that contains displacement data of the smartphone in the movement.

Step 6: obtain multiple images of the LED lamp by shooting video streams, and obtain a distance $Z_c$ from the LED lamp to the center of the camera based on triangle similarity theorems:

$$Z_c = B \times f/d$$

where d is a length between the center points of the LED lamp in two images, and B is an actual interval between the two images taken by the camera. B is calculated based on acceleration sensor data in the IMU. Alternatively, the radius $R_o$ of the LED lamp is compared with a minor axis of an ellipse obtained from the image, to obtain a ratio parameter s, and then d is used to calculate B according to the same ratio parameter s.

Step 7: obtain a projection matrix of the camera based on the intrinsic and extrinsic matrices of the camera, and for any image point $P_w(X_w, Y_w, Z_w)$ in space, obtain a location ($\mu$, v) of an image point $p_i$ based on the projection matrix and the distance $Z_c$ from the LED lamp to the center of the camera.

$$Z_c \begin{bmatrix} \mu \\ V \\ 1 \end{bmatrix} = M_1 M_2 \begin{bmatrix} X_w \\ Y_w \\ Z_w \\ 1 \end{bmatrix}$$

where $Z_c$ is the distance from the LED lamp to the center of the camera.

Step 7: when the location ($\mu$, v) of the image point $p_i$ is known, use the intrinsic matrix $M_1$ of the camera to convert the image point $p_i$ in the image coordinate system into an image point $P_c$ in a camera coordinate system, use the extrinsic matrix $M_2$ to convert the image point $P_c$ into an image point $P'_w$ in the world coordinate system, and then add specific coordinates ($X_o$, $Y_o$, $Z_o$) of the LED lamp in the world coordinate system to $P'_w$ to obtain coordinates $P_w$ of the smartphone:

$$P_w = p'_w + (X_o, Y_o, Z_o)$$

Step 8: according to the coordinates $P_w$ of the smartphone, transmit service data information related to the coordinates $P_w$ of the smartphone through the LED lamp; shoot video streams of the LED lamp by using the camera of the smartphone, and decode and demodulate the data transmitted by the LED lamp to obtain the related service data information.

Preferably, the data transmitted by the LED lamp is encoded and modulated by using RLL coding and Raptor coding.

Preferably, the video taken by the smartphone is 30 or 60 frames per second.

An indoor visible light positioning system based on a single LED lamp includes an LED communication module, a power module, and a smartphone module. The power module supplies power to the LED communication module. The LED communication module includes a coding and modulation module, a control module, and an LED lamp, where the control module controls the LED lamp according to the coding and modulation module. The smartphone module includes a camera, a decoding and demodulation module, an IMU module, a positioning module, and a location-based service module, where the camera, the decoding and demodulation module, and the positioning module are connected in turn, and the camera, the IMU module, and the location-based service module are all connected to the positioning module.

Preferably, the location-based service module includes a positioning navigation module, an information service module, a tracking and identification module, and a security check module.

Compared with the prior art, the present invention has the following beneficial effects:

Various embodiments of the present invention can be applied to scenarios where there is only a single LED lamp in the room, and has broad application prospects. It uses the camera and IMU module of the smartphone, requiring no other light sensors or additional physical modules on the LED lamp. The camera can accurately identify frequencies of the LED lamp, and no extra devices need to be introduced as in non-VLP technologies. At least one embodiment of the present invention uses the homography matrix as a constraint and optimization condition, which can better improve the positioning accuracy. Based on such positioning accuracy, at least one embodiment of the present invention provides location-based services, allowing users to perform self-positioning, navigation, query, and other operations in various scenarios such as shopping malls and scenery spots.

Figure 1:
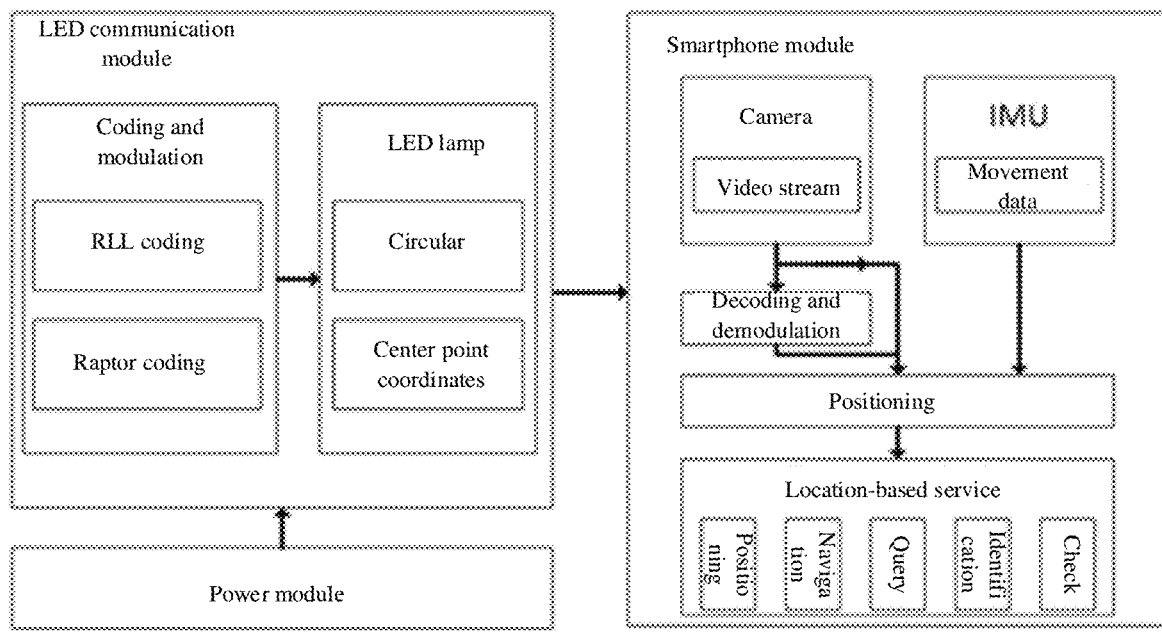
FIG. 1 is a system framework design diagram according to an embodiment of the present invention.

In the figure, 1. circular LED lamp, 2. smartphone, 3. room with only one LED lamp, 4. encoding for the LED lamp, and 5. user with a smartphone in hand.

DETAILED DESCRIPTION

The following further describes embodiments of the present invention with reference to the drawings and specific embodiments. It should be understood that these embodiments are only used to illustrate the present invention but not intended to limit the scope of the present invention. Those skilled in the art should understand that any equivalent modifications to the present invention shall fall within the scope defined by the claims.

As shown in FIG. 1 to FIG. 5, an indoor visible light positioning method based on a single LED lamp is used with visible light communication and computer vision technologies, to position smartphone users indoor when there is only a single LED lamp. Coding and modulation are performed for the LED lamp on the ceiling by using RLL coding and Raptor coding. The blink frequency of the LED lamp includes information such as a specific location ($X_o, Y_o, Z_o$), a radius $R_o$, and an ID of the lamp in a world coordinate system. The blink effect of the LED lamp is invisible to the naked eye, so it will not affect people's life. A camera uses a rolling shutter to capture images. When a CMOS imager uses a short exposure time to capture fast-modulated LED, a band effect occurs. Different LED frequencies or duty cycles change the widths of bright and dark bands in an image. After the camera shoots the LED image, it can perform decoding and demodulation according to the corresponding band effect for identification.

In embodiments of the present invention, after coding and modulation are performed for the circular LED lamp on the ceiling, an IMU of a smartphone is used to collect movement data of the smartphone, and meanwhile, a camera is used to shoot videos of the LED lamp at the same time.

The IMU measures acceleration ($a_x, a_y, a_z$) and rotation angle information ($\alpha, \beta, \gamma$) of the smartphone in all directions to calculate a movement direction and displacement ($t_x, t_y, t_z$) of the smartphone. During actual operations, the smartphone must capture video streams and collect the IMU data at the same time, and the time and quantity units of the extracted data and video frames must be unified.

As a circular LED lamp is used in various embodiments of the present invention, a changed elliptic shape is projected onto a video frame image, together with some feature point information in the ellipse. In such cases, it is necessary to obtain a focal length of the smartphone camera and a physical dimension of each pixel, and collect and preprocess all IMU data, so as to obtain values of a pitch angle $\alpha$, a roll angle $\beta$, and a yaw angle $\gamma$, and relative location change data of the smartphone during the movement of the smartphone. Ideally, intrinsic and extrinsic matrices of the smartphone camera can be obtained based on such data. Generally, the intrinsic matrix $M_1$ of a same smartphone does not change, while the extrinsic matrix $M_2$ changes as the smartphone moves or rotates.

For computer vision, basic knowledge of camera perspective projection models can be obtained from relevant literature, for example, a conversion relationship between an image coordinate system, a camera coordinate system, and a world coordinate system, and intrinsic and extrinsic parameters of the camera described in the pinhole imaging model (linear camera model). The intrinsic matrix $M_1$ of the camera is responsible for converting the camera coordinate system to a pixel coordinate system:

$$M_1 = \begin{bmatrix} f/d_X & 0 & \mu_0 \\ 0 & f/d_Y & v_0 \\ 0 & 0 & 1 \end{bmatrix}$$

f represents a focal length of the camera, $d_X$ and $d_Y$ represent physical dimensions of each pixel in an image in the X axis and Y axis, and $(u_0, v_0)$ represents an origin of an image coordinate system, and defines an intersection of the camera's optical axis and the image plane, usually at the center of the image. The extrinsic matrix is generated by the camera during movement and rotation and keeps changing. The extrinsic matrix is generally expressed as follows:

$$M_2 = \begin{bmatrix} R & t \\ 0^T & 1 \end{bmatrix}$$

In the extrinsic matrix, $0=(0,0,0)^T$; R is a rotation matrix of the smartphone, a matrix of orthogonal units with a size of 3×3; and t is a three-dimensional translation variable that contains displacement data of the smartphone during moving in three directions. A projection matrix of the camera can be obtained by obtaining the intrinsic and extrinsic matrices of the camera. Then, for any point $P_w$ in space, a location $(\mu, v)$ of an image point $p_i$ can be obtained through projection matrix conversion $$Z_c \begin{bmatrix} \mu \\ v \\ 1 \end{bmatrix} = M1M2 \begin{bmatrix} X_W \\ Y_W \\ Z_W \\ 1 \end{bmatrix}$$

Similarly, when the image point $p_i$ ($\mu$, v) is known, a point $p_i$ in the image coordinate system can be converted to $P_c$ in the camera coordinate system by using the intrinsic matrix $M_1$, $P_c$ is converted to $P'_w$ in the world coordinate system by using the extrinsic matrix $M_2$, and then specific coordinates $(X_o, Y_o, Z_o)$ of the LED lamp in the world coordinate system are added to $P'_w$, to obtain coordinates $P_w$ of the smartphone. During the conversion, a distance $Z_c$ from the LED lamp to the center of the camera needs to be obtained.

In embodiments of the present invention, multiple images of the LED lamp are obtained by shooting video streams, to simulate a binocular visual ranging method, and obtain $Z_c$ based on triangle similarity theorems.

$$Z_c = B \times f/d$$

d is a parallax between two images, that is, a length between the center points of the LED lamp in two images, and B is an actual interval between the two images taken by the camera. B can be calculated based on acceleration sensor data in the IMU. Alternatively, the radius $R_o$ of the LED lamp is compared with a minor axis of an ellipse obtained from the image, to obtain a ratio parameter s, and then d is used to calculate B according to the same ratio parameter s.

Then, $Z_c$ is used for conversion between the pixel coordinate system and the world coordinate system to obtain the location of the smartphone in the world coordinate system. During the data measurement, however, a measured value of a yaw angle in a rotation angle is quite different from a true value because a magnet sensor is vulnerable to interference from the ambient environment. This reduces the positioning accuracy. Therefore, the following method is used to constrain the location of the smartphone.

The video streams of the LED lamp shot by the camera are divided into single image frames by timeslot. For every two adjacent images $I_i$ and $I_{i+1}$, a homography matrix can be calculated based on the knowledge of computer vision:

$$H_{i,i+1} = K[R_{i,i+1} + t_{i,i+1}n_i^T/z_i]K^{-1}$$

$n_i$ is a normal vector of a lamp plane in an $i^{th}$ camera coordinate system, $z_i$ is a distance from a center of the camera to the lamp plane when the $i^{th}$ image is taken. When image frames are extracted by timeslot, movement data of the smartphone is processed to obtain the intrinsic matrix $M_1$, the extrinsic matrix $M_2$, and the movement distance $(t_x, t_y, t_z)$ of the smartphone between every two image frames.

For multi-view geometry, the homography matrix $H_{i,i+1}$ between $I_i$ and $I_{i+1}$ can be exported through elliptical shapes projected onto the images. An ellipse on each image can be represented by a conic coefficient matrix:

$$C_i = \begin{bmatrix} a_i & 0 & d_i/2 \\ 0 & c_i & e_i/2 \\ d_i/2 & e_i/2 & f_i \end{bmatrix}$$

Under the homography matrix, $H_{i,i+1}$, $C_i$ is converted into $C_{i+1} = H_{i,i+1}^{-T} C_i H_{i,i+1}^{-1}$. In this way, a precise constraint is defined for calibrating $R_{i,i+1}$ and $t_{i,i+1}$. Due to errors in the three rotation angles and each displacement change, accurate solutions may not be produced. In this case, the system uses the following method to solve the problem.

$$\min_{z_1, z_2, \ldots z_n} \|C_{i+1} - H_{i,i+1}^{-T} C_i H_{i,i+1}^{-1}\|_2$$

Solutions to various data are obtained by using optimized methods, to calibrate $R_{i,i+1}$ and $t_{i,i+1}$, constrain a movement status of the smartphone, correct the IMU measurement data of the smartphone, reduce the error of the rotation angles in all directions, and improve the positioning accuracy of the LED lamp. In this way, the problem that the magnet sensor is vulnerable to interference is resolved, and the location of the smartphone is obtained.

After the positioning is realized, at least one embodiment of the present invention uses a highly reliable modulation and coding technology to build a visible light communication network, and provides location-based information services to smartphones through the communication network. User authentication and authorization can be performed first. During provision of the location-based service, information that interests users most is filtered and sent to the users, and users are allowed to store personalized information. Embodiments of the present invention can provide users with various services such as positioning, navigation, query, identification, and event inspection in places like shopping malls, scenery spots, and underground garages.

As shown in FIG. 1, an indoor visible light positioning system based on a single LED lamp includes an LED communication module, a power module, and a smartphone module. The power module supplies power to the LED communication module. The LED communication module includes a coding and modulation module, a control module, and an LED lamp, where the control module controls the LED lamp according to the coding and modulation module. The smartphone module includes a camera, a decoding and demodulation module, an IMU module, a positioning module, and a location-based service module, where the camera, decoding and demodulation module, and the positioning module are connected in turn; the camera, the IMU module, and the location-based service module are all connected to the positioning module; and the location-based service module includes a positioning navigation module, an information service module, a tracking and identification module, and a security check module. A series of materials obtained by the camera and IMU in the smartphone can provide accurate positioning for the system, which then provides location-based services. In the LED communication module, a LED lamp is set to circular. Through coding and modulation, visible light blinks at a specific frequency, to transmit information of the LED lamp. The smartphone module collects IMU data and uses the camera to shoot video streams of the LED lamp. The video streams and various data are extracted to accurately locate the smartphone and provide location-based services to the smartphone user.

The smartphone module includes the camera and the IMU. The camera with a focal length of f is configured to shoot video streams of the LED lamp, and meanwhile, the IMU collects movement status data of the smartphone, such as rotation angles ($\alpha$, $\beta$, $\gamma$) in all directions and acceleration ($a_x$, $a_y$, $a_z$) in all directions, to obtain an intrinsic matrix $M_1$ and an extrinsic matrix $M_2$ of the smartphone. LED lamp images after short exposure are obtained by the camera, and data such as the specific frequency of the LED light, center point coordinates, and a radius of the LED lamp can be identified from ellipse images of the LED lamp.

Figure 2:
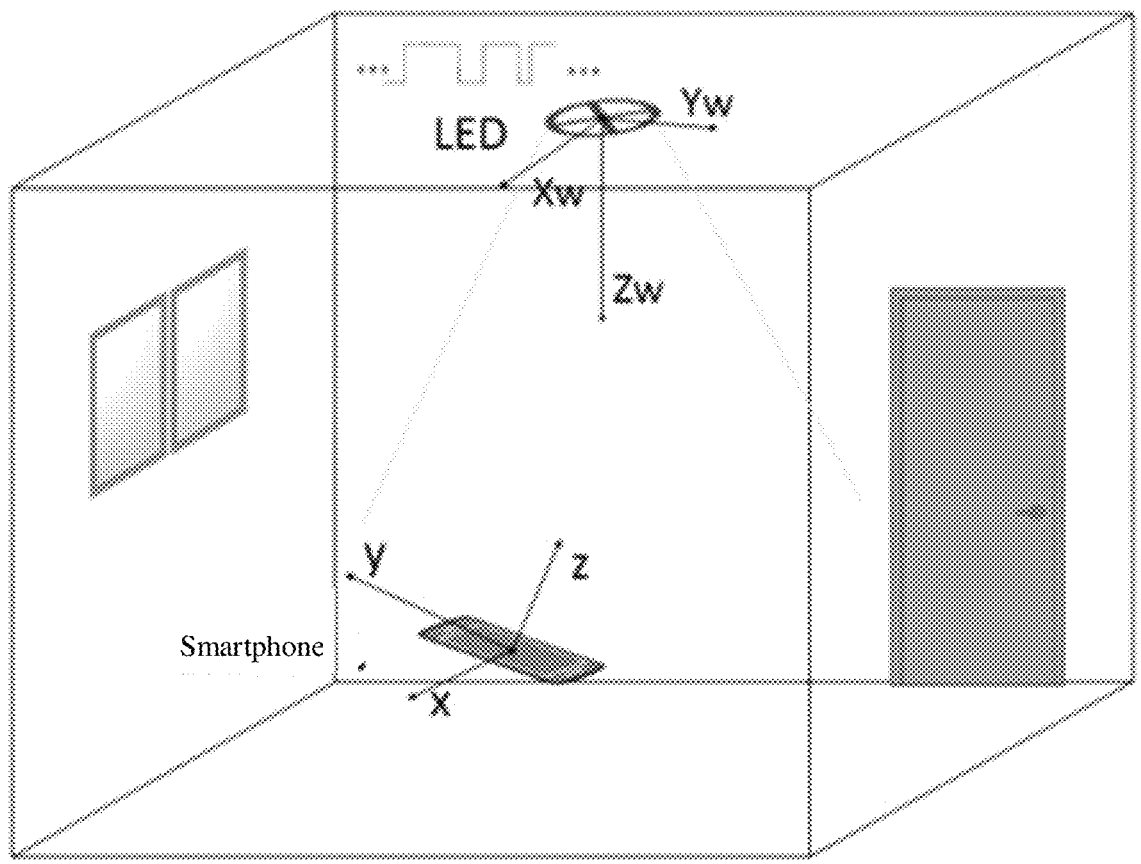
FIG. 2 is a system deployment diagram according to an embodiment of the present invention.

As shown in FIG. 2, a circular LED lamp with a diameter of 21 cm is disposed on the ceiling 3 or 4 meters from the ground. The rated voltage is 12 V. The LED lamp consists of nine small LED lamps, each being 0.2 W. The coding schemes (4) used for LED lamp communication is RLL coding and Raptor coding. The smartphone is Huawei TRT-AL00A, with a camera focal length of 35 mm. A user holds the smartphone at a height between 110 cm and 180 cm, to shoot video streams of the LED lamp. In actual deployment, various LED lamp and smartphone models can be used.

Firstly, the LED lamp is deployed on the ceiling, and a location of the LED lamp, such as (0, 0, 0) is set. In more complex indoor scenarios, it is necessary to assign specific accurate coordinates to each LED lamp, and then perform coding and modulation to facilitate the management by a system positioning module. In addition, a focal length of the smartphone camera, and a ratio between a pixel distance and an actual distance for photography need to be extracted as basic inputs. Then, video streams of the LED lamp are shot, and IMU measurement data of the smartphone is recorded.

Figure 3:
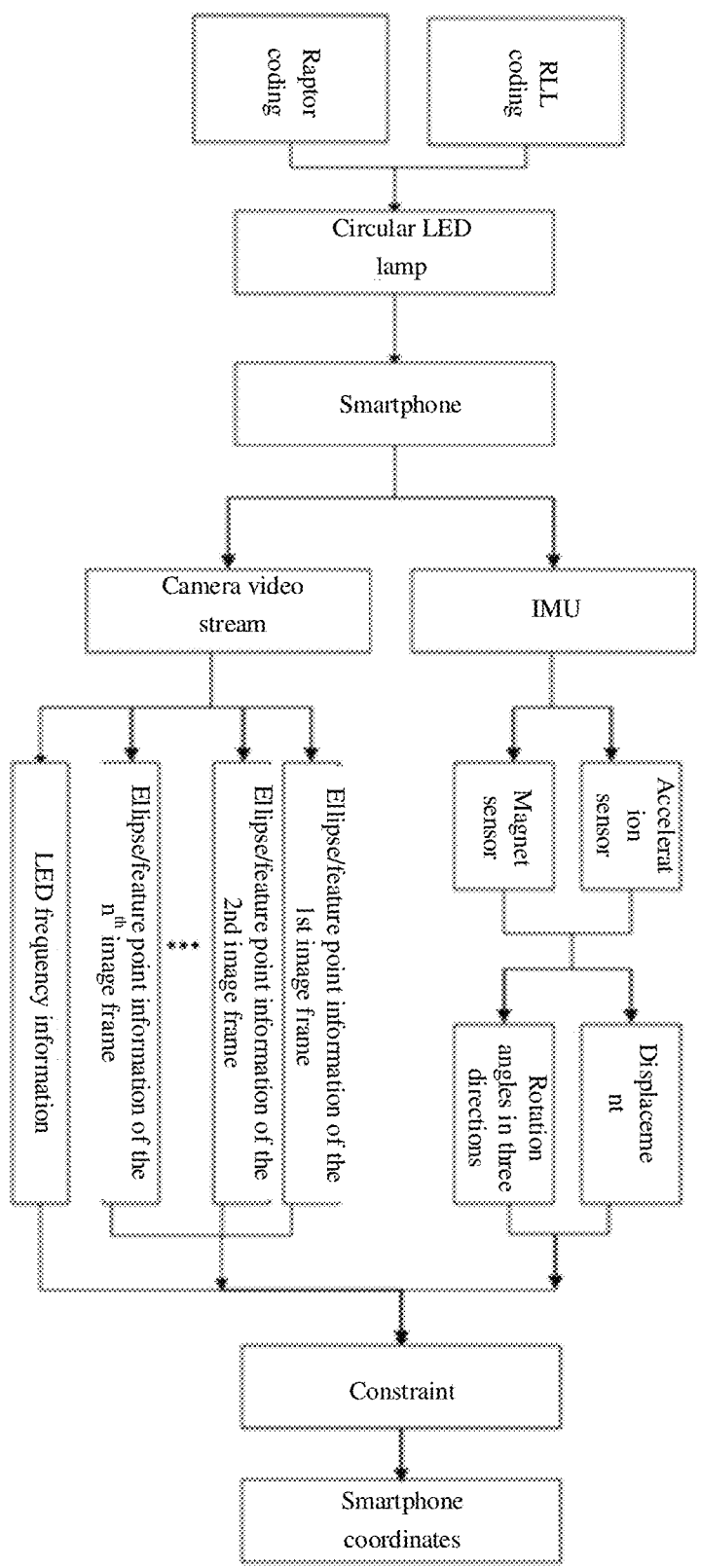
FIG. 3 is a schematic diagram of visible light positioning according to an embodiment of the present invention.

As shown in FIG. 3, video streams are extracted frame by frame at fixed time intervals. In this design, a video captured by the smartphone is 30 frames per second. If the video is 30 or 60 frames per second, one image frame is extracted every one or two seconds. The IMU data at each time interval is compared with the frames extracted from the video streams. After the matching is completed, a specific rotation matrix R and a relative displacement vector t are generated between every two frames. For each image frame, a center point of an ellipse is extracted, and all parameters required for a general equation of the ellipse in each image frame is obtained, to construct a homography matrix of each ellipse. Movement data collected by the IMU of the smartphone is corrected by using the homography matrix, especially the rotation angles of the smartphone. Such a design can reduce IMU data drift errors.

Figure 4:
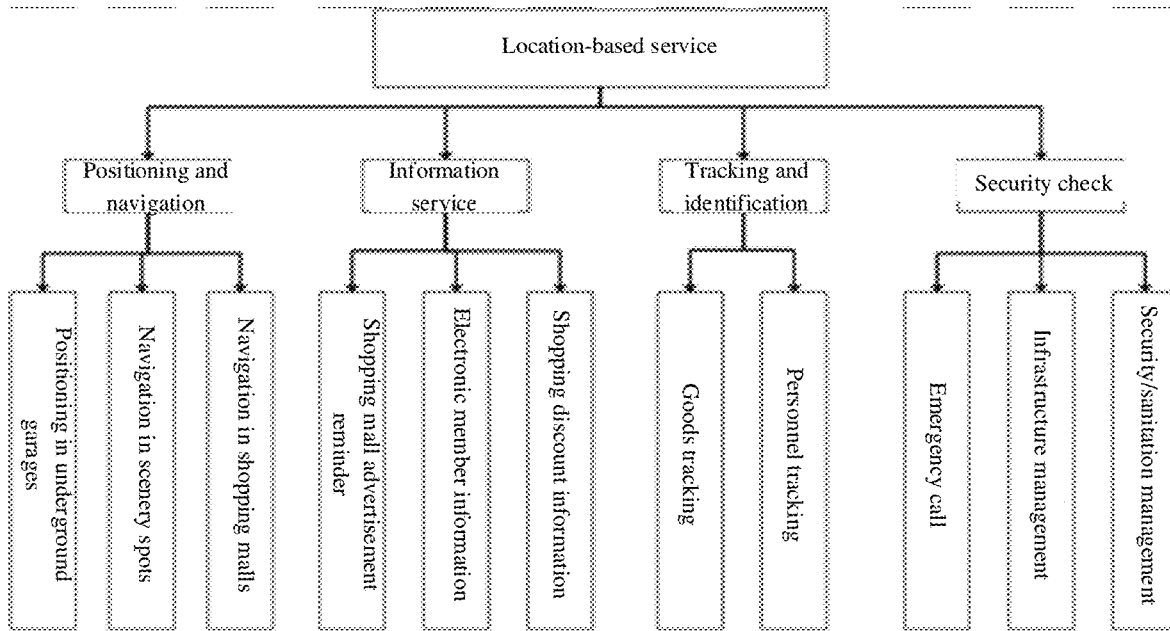
FIG. 4 is a schematic diagram of a location-based service according to an embodiment of the present invention.
Figure 5:
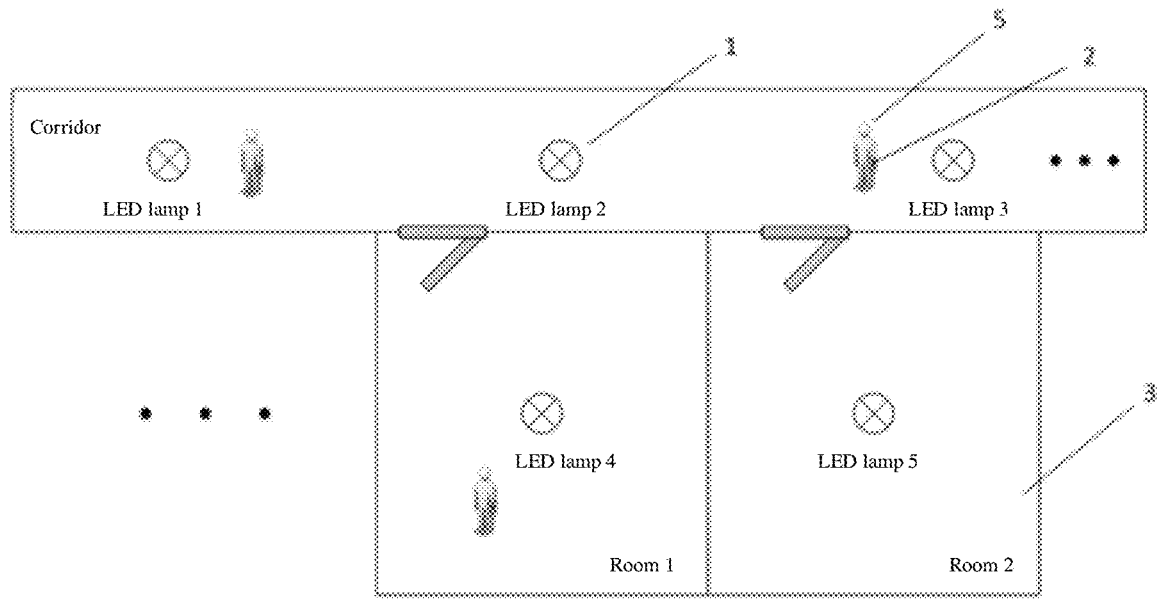
FIG. 5 is a schematic diagram of a single-LED scenario according to an embodiment of the present invention.

As shown in FIG. 4, location-based services mainly include positioning, navigation, information services, tracking and identification, and security check. Functions can also be added according to user needs. LED lamps are widely used in various places, such as shopping malls, scenery spots, and underground garages. Therefore, this system can be applied in various scenarios, without requiring extra devices. Single-LED scenarios shown in FIG. 5 are common in real life, and the system can better provide location-based services for smartphone users.

The above descriptions are merely preferred implementations of the present invention. It should be noted that a person of ordinary skill in the art may further make several improvements and modifications without departing from the principle of the present invention, but such improvements and modifications shall also be deemed as falling within the protection scope of the present invention.

What is claimed is:

1. An indoor visible light positioning method based on a single LED lamp, comprising:

step 1: using the visible light communication technology to encode and modulate to-be-sent information, and transmitting the information through an LED lamp;

step 2: shooting video streams of the LED lamp by using a camera of a smartphone, and recording data measured by an inertial measurement unit (IMU) of the smartphone; and measuring, by the IMU, acceleration ($a_x$, $a_y$, $a_z$) and rotation angle information ($\alpha$,$\beta$,$\gamma$) of the smartphone in all directions to calculate a movement direction and displacement ($t_x$, $t_y$, $t_z$) of the smartphone;

step 3: capturing LED lamp images from each frame of the video streams, decoding and demodulating the data transmitted by the LED lamp, extracting an LED lamp shape from the images, and collecting a location ($X_o$, $Y_o$, $Z_o$) and a radius $R_o$ of the LED lamp in a world coordinate system;

step 4: dividing the video streams into single image frames by timeslot, and for every two adjacent images $I_i$ and $I_{i+1}$, calculating a homography matrix:

$$H_{i,i+1}=K[R_{i,i+1}+t_{i,i+1}n_i^T/z_i]K^{-1}$$

wherein $H_{i,i+1}$ is the homography matrix, K is an intrinsic matrix of the smartphone camera, $n_i$ is a normal vector of a lamp plane in an $i^{th}$ camera coordinate system, $z_i$ is a distance from a center of the camera to the lamp plane when the $i^{th}$ image is taken, $R_{i,i+1}$ is a rotation matrix of the camera, and $t_{i,i+1}$ is a displacement parameter of the camera;

a general elliptic equation is:

$$ax^2+bxy+cy^2+dx+ey+f=0$$

for multi-view geometry, exporting the homography matrix $H_{i,i+1}$ between $I_i$ and $I_{i+1}$ through elliptical shapes projected onto the images, wherein an ellipse on each image is represented by a conic coefficient matrix $C_i$:

$$C_i = \begin{bmatrix} a_i & 0 & d_i/2 \\ 0 & c_i & e_i/2 \\ d_i/2 & e_i/2 & f_i \end{bmatrix}$$

wherein [$a_i$, $b_i$, $C_i$, $d_i$, $e_i$, $f_i$] represent coefficients of a general equation of an ellipse projected on the $i^{th}$ image;

under the homography matrix $H_{i,i+1}$, converting $C_i$ into $C_{i+1}=H_{i,i+1}^{-T}C_iH_{i,i+1}^{-1}$ to establish an optimization model:

$$\min_{z_1, z_2, \ldots z_n} \|C_{i+1} - H_{i,i+1}^{-T}C_iH_{i,i+1}^{-1}\|_2$$

wherein $z_1, z_2, \ldots z_n$ represents a distance from the center of the camera to the lamp plane when image 1, 2, ..., n is taken, and n represents a total quantity of video frames; and calibrating the rotation matrix $R_{i,i+1}$ through the optimization model;

step 5: calculating intrinsic and extrinsic matrices of the camera based on the calibrated camera parameters, wherein the intrinsic matrix $M_1$ is:

$$M_1 = \begin{bmatrix} f/d_X & 0 & \mu_0 & 0 \\ 0 & f/d_Y & v_0 & 0 \\ 0 & 0 & 1 & 0 \end{bmatrix}$$

wherein f is a focal length of the camera, $d_X$ and $d_Y$ represent physical dimensions of each pixel in an image in the X axis and Y axis, and $(u_0, v_0)$ represents an origin of an image coordinate system; and calculating the extrinsic matrix $M_2$ based on the movement direction and displacement $(t_x, t_y, t_z)$ of the smartphone:

$$M_2 = \begin{bmatrix} R & t \\ 0^T & 1 \end{bmatrix}$$

in the extrinsic matrix, $0^T=(0,0,0)^T$, R is the rotation matrix of the smartphone, and t is a three-dimensional translation variable that contains displacement data of the smartphone in the movement;

step 6: obtaining multiple images of the LED lamp by shooting video streams, and obtaining a distance $Z_c$ from the LED lamp to the center of the camera based on triangle similarity theorems:

$$Z_c = B \times f/d$$

wherein d is a length between the center points of the LED lamp in two images; B is an actual interval between the two images taken by the camera; B is calculated based on acceleration sensor data in the IMU; or the radius $R_o$ of the LED lamp is compared with a minor axis of an ellipse obtained from the image, to obtain a ratio parameter s, and then d is used to calculate B according to the same ratio parameter s;

step 7: obtaining a projection matrix of the camera based on the intrinsic and extrinsic matrices of the camera, and for any image point $P_w(X_w, Y_w, Z_w)$ in space, obtaining a location $(\mu, v)$ of an image point $p_i$ based on the projection matrix and the distance $Z_c$ from the LED lamp to the center of the camera:

$$Z_c \begin{bmatrix} \mu \\ v \\ 1 \end{bmatrix} = M_1 M_2 \begin{bmatrix} X_W \\ Y_W \\ Z_W \\ 1 \end{bmatrix}$$

wherein $Z_c$ is the distance from the LED lamp to the center of the camera;

step 6: when the location $(\mu, v)$ of the image point $p_i$ is known, using the intrinsic matrix $M_1$ of the camera to convert the image point $p_i$ in the image coordinate system into an image point $P_c$ in a camera coordinate system, using the extrinsic matrix $M_2$ to convert the image point $P_c$ into an image point $P'_w$ in the world coordinate system, and then adding specific coordinates $(X_o, Y_o, Z_o)$ of the LED lamp in the world coordinate system to $P'_w$ to obtain coordinates $P_w$ of the smartphone; and step 7: according to the coordinates $P_w$ of the smartphone, transmitting service data information related to the coordinates $P_w$ of the smartphone through the LED lamp; shooting video streams of the LED lamp by using the camera of the smartphone, and decoding and demodulating the data transmitted by the LED lamp to obtain the related service data information.

2. The indoor visible light positioning method based on a single LED lamp according to claim 1, wherein coding and modulation is performed for the LED lamp by using run length limited (RLL) coding and Raptor coding.

3. The indoor visible light positioning method based on a single LED lamp according to claim 2, wherein a video taken by the smartphone is 30 or 60 frames per second.

4. A system using the indoor visible light positioning method based on a single LED lamp according to claim 1, comprising: an LED communication module, a power module, and a smartphone module, wherein the power module supplies power to the LED communication module; the LED communication module comprises a coding and modulation module, a control module, and an LED lamp, wherein the control module controls the LED lamp according to the coding and modulation module; and the smartphone module comprises a camera, a decoding and demodulation module, an IMU module, a positioning module, and a location-based service module, wherein the camera, the decoding and demodulation module, and the positioning module are connected in turn, and the camera, the IMU module, and the location-based service module are all connected to the positioning module.

5. The system according to claim 4, wherein the location-based service module comprises a positioning and navigation module, an information service module, a tracking and identification module, and a security check module.

* * * * *